WILLIAM CAMERER.

Improvement in Saftey Valves.

No. 122,756.  Patented Jan. 16, 1872.

WITNESSES:

INVENTOR:

William Camerer.

UNITED STATES PATENT OFFICE.

WILLIAM CAMERER, OF READING, PENNSYLVANIA.

IMPROVEMENT IN SAFETY-VALVES.

Specification forming part of Letters Patent No. 122,756, dated January 16, 1872.

Specification describing certain Improvements in Safety-Valves, invented by WILLIAM CAMERER, of Reading, in the county of Berks and State of Pennsylvania.

The object of my invention relates to the overcoming of a mechanical difficulty in the manufacture of such safety-valves as have an enlarged area outside of the valve-seat, which enlargement is for the purpose of resisting to some extent the increased power of the spring when the valve is lifting and compressing the spring. It relates also to the production of a valve which is absolutely frictionless.

Figure 1:
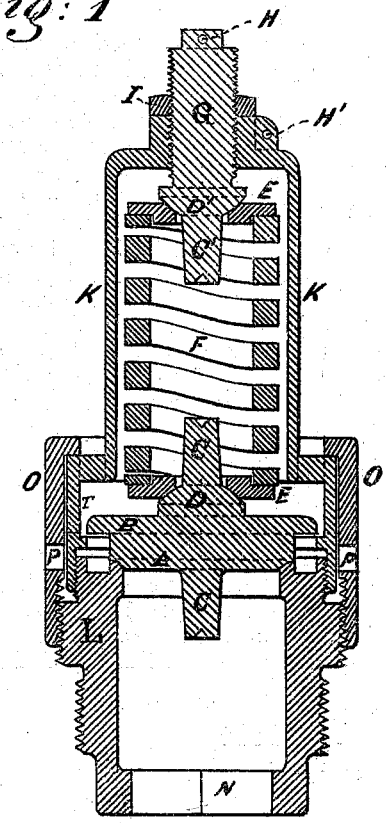
Figure 2:
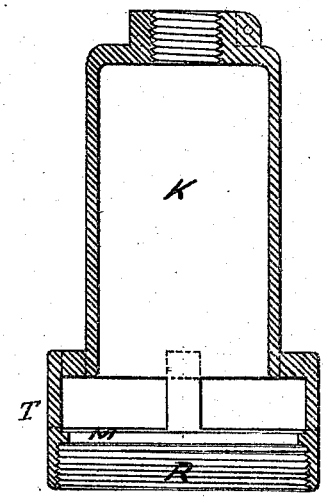
Figure 3:
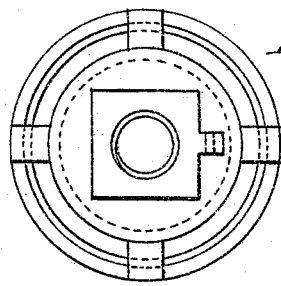

Figure 1 is a section of the whole arrangement embodying my invention. Fig. 2 is a section of the upper part thereof in detail. Fig. 3 is the plan of Fig. 2.

A is the valve-seat. B is the enlargement of the valve. C C and C' are projections with their centers to facilitate the finishing on the lathe. D D' are spherical bearings for the rings E E, holding the spring F in place. G is the screw wherewith to compress the spring F. H H are small holes to be connected with a wire and sealed with lead to prevent the altering of the pressure, if so desired. I is a lock-nut. K is a case inclosing the spring. T is a ring or sleeve around the valve. It is attached by arms to the case K, and is provided with an inner flange, M. The sleeve T is screwed down on the seat L to such a position that the upper part of the flange M, Fig. 2, leaves the desired annular opening under the enlargement B of the valve. N is a square opening in L, in which a suitable tool can be inserted for screwing it to its final position. O is a casing acting as a lock to keep the parts K and L in position, and to direct the current of the escaping steam or fluid upward.

Should the space between B and M be a trifle too large no result will be got at all from the enlarged area, and the valve will work like a plain one without any enlargement. On the other hand, if the space is too small, the action on the additional area of the valve is so great that, if blowing off at one hundred pounds' pressure, it will continue to blow until the pressure is reduced to ninety or less pounds. If the space is what it ought to be, then such a valve will close without losing more pressure than one pound, or even less. To secure such perfection without repeated trials and alterations I made the space between M and B adjustable by means of the screw-thread R, Fig. 2.

The adjusting is done in a few minutes while the valve is under pressure, thereby saving time and work, and always insuring success.

What I claim as my invention is—

The flange M within the sleeve T moving on the seat L, whereby the size of the annular space under the enlarged portion of the valve is adjusted, substantially as described.

WILLIAM CAMERER.

Witnesses:
W. E. GOOD,
E. J. RAUCH.

(148)